United States Patent [19]

Plummer

[11] 3,761,780

[45] Sept. 25, 1973

[54] POWER OUTLET BOX AND SEPARABLE PEDESTAL

[75] Inventor: Merle A. Plummer, North Hollywood, Calif.

[73] Assignee: Myers Electric Products, Inc., Montebello, Calif.

[22] Filed: May 2, 1972

[21] Appl. No.: 249,512

[52] U.S. Cl. .................................. 317/120, 174/38
[51] Int. Cl. ............................................ H02b 5/02
[58] Field of Search ...................... 174/38, 60, 100; 317/104, 107, 111, 112, 120, 118, 101 DH, 101 CB, 119

[56] References Cited
UNITED STATES PATENTS

| 3,549,951 | 12/1970 | Plummer | 317/107 |
| 3,502,785 | 3/1970 | Nickola | 174/38 |
| 3,585,456 | 6/1971 | Phillips, Jr. | 174/38 |

OTHER PUBLICATIONS

Midwest Catalogue 69, Midwest Electrical Products, Inc., Mankato, Minn., February 1969, pages 26–28.

Primary Examiner—J. V. Truhe
Assistant Examiner—Gerald P. Tolin
Attorney—Howard L. Johnson

[57] ABSTRACT

Assembly consisting of separable pedestal and structurally mated electric outlet box, the latter having dependently projecting bayonet inserts which automatically form a circuit with the pedestal installations upon the box being located on top, the bayonets being part of internal, longitudinally upstanding, bus bars which simultaneously form structural supports for the box. The pedestal alone can first be permanently located at a site projecting out of the ground and its internal attachment lugs there connected to underground power lines. A group of such pedestals can thus be installed upon initially laying out a mobile home park, housing tract, or industrial park, and the flat top capped with a temporary hood. Individual outlet boxes containing circuit breakers, etc., adapted to individual requirements of each home or shop can later be assembled and installed as the particular requirements become known. Each pedestal has top-opening guide slots and aligned spring jaws therebeneath for insertion of the bayonet inserts from the box. Due to the structural support provided by the bayonet-tipped bus bars, the outlet box can be mounted offcenter to the pedestal, and service conduits brought out through apertures in its projecting bottom wall, without interference from the pedestal.

10 Claims, 6 Drawing Figures

United States Patent [19]
Plummer
[11] 3,761,780
[45] Sept. 25, 1973
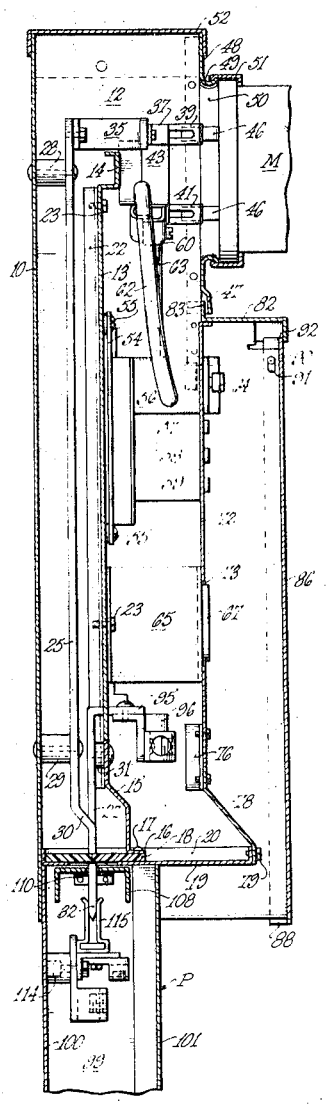

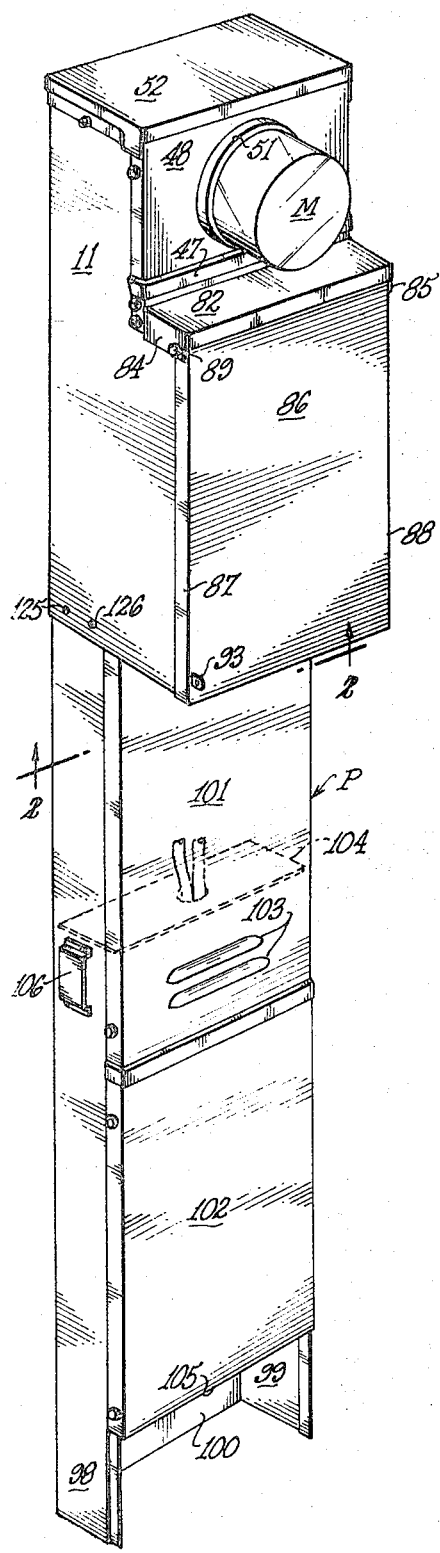
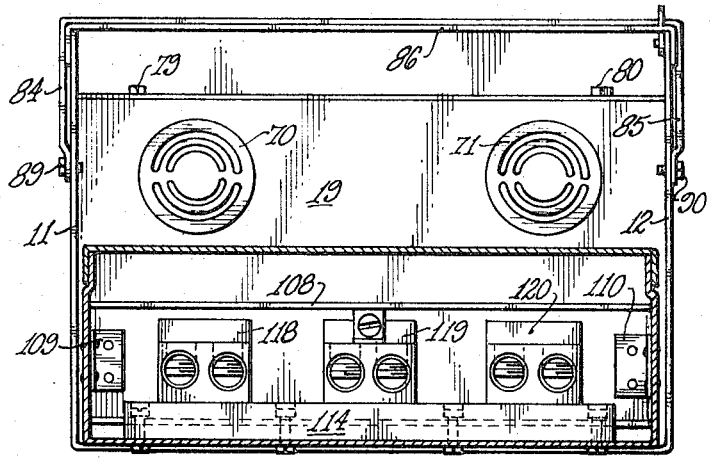
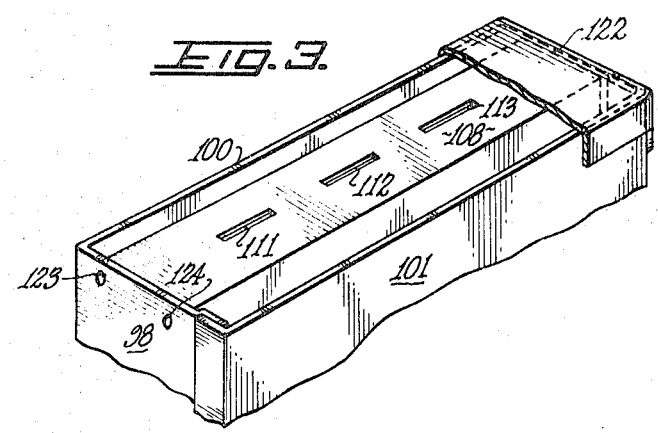
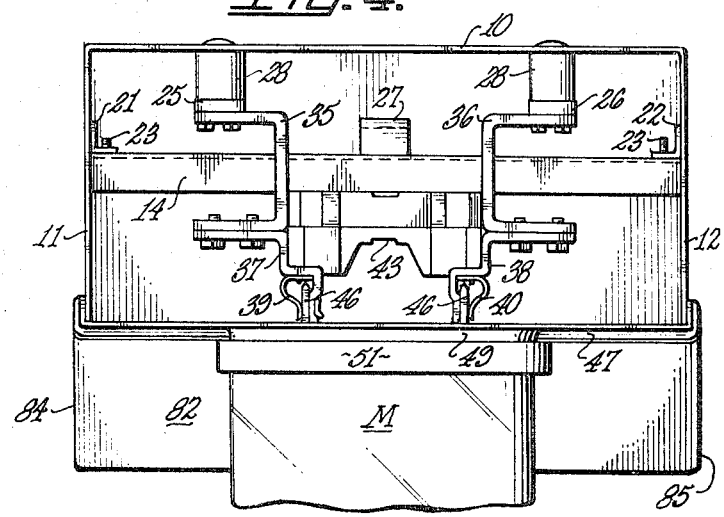

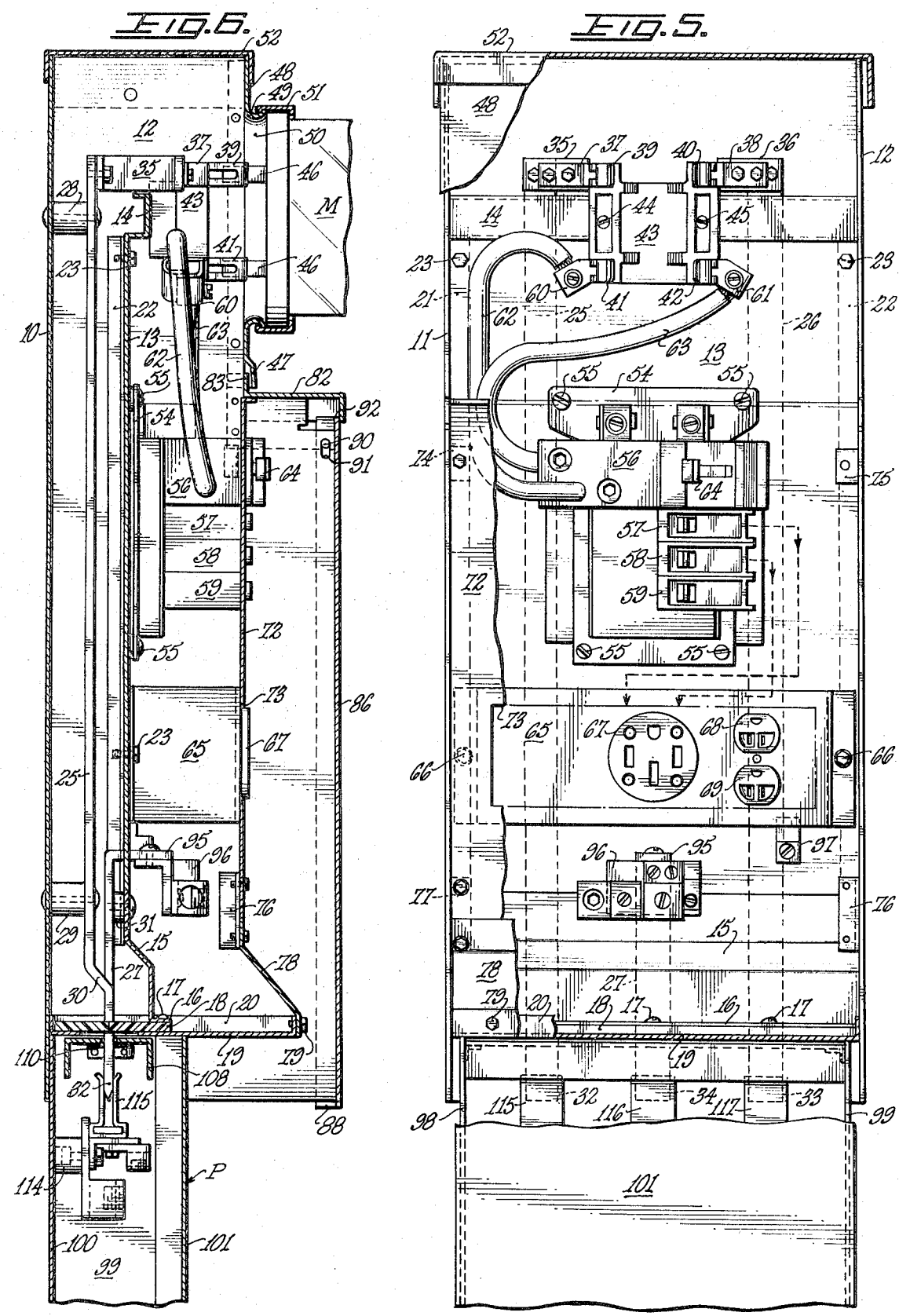

POWER OUTLET BOX AND SEPARABLE PEDESTAL

This invention relates to electric power outlet boxes or service centers which are installations wherein main line power conduits are connected to various outlet conduits as may be required for a particular shop or residence which is thus served by the center. In areas where electric power is transmitted by underground cable, such line must be tapped by an outlet box or housing which distributes the current to a plurality of outlet lines in conjunction with circuit breakers, a meter, etc. Likewise telephone and cable television conduits can be connected to the same shop or residence through such junction box, especially when the lines are carried underground in the immediate service area.

In laying out a new tract such as an industrial park or a mobile home park, it would be advantageous to be able to install a junction box at each location in connection with early paving and grading work without necessarily waiting for construction of the building or placing of the mobile home. However at such point of time it often is not known what current requirements and hence what ratings of circuit breakers will be needed at each location; for example, whether the mobile home which later will be moved to that location will have airconditioning, or will use electricity for space heater and refrigerator (instead of gas), or will have an electric washer-dryer unit, etc.

Accordingly the present invention provides a two-unit assembly which automatically fits together structurally so as to interlock, but which units may be installed or connected in tandem with any amount of lag time or delay between the first and second installations. In particular, the pedestal unit by itself can be located at a site, projecting up out of the ground with internal terminals connected to the buried line conduits, and its top then covered indefinitely with a removable hood. The mated unit or power outlet box is characterized by a pair of bus bars, laterally separated, which extend lengthwise nearly the height of the box and project vertically downward from the flat bottom face thereof in the form of bayonet contacts adapted for insertion in aligned jaws of the pedestal, disposed adjacent the top support surface of the pedestal. The bus bars form part of the electric circuit but in addition, in the present construction, they constitute structural elements of the outlet box or housing, so that the latter may be mounted offcenter atop the pedestal and the outlet lines may thus be brought out through apertures in the projecting (overhanging) bottom wall of the box without interference from the pedestal. Within the housing, the bus bars are insulated from the housing proper, and are electrically connected to the meter, circuit breaker(s) and outlet lines. The outlet box itself may be grounded by a third bus bar similarly bayonet-connected to the pedestal. Thus the outlet box may be custom equipped with the required circuit breaker(s) before being brought to the site, and may there be connected to the service outlet lines, either before or after being located atop the pedestal. But any box can be located atop any pedestal, since the line of bottom-projecting bayonet contacts (of the box) always align with the plurality of spring jaws, upward-opening, adjacent the top support surface of the pedestal. The pattern of jaws and inserts can of course be varied as long as both are varied in unison (that is, at the time and place of manufacture).

The invention may be further exemplified by reference to the accompanying drawings which illustrate presently preferred embodiments.

FIG. 1 is a perspective view, looking down from in front, of an assembled power outlet box and separable pedestal.

FIG. 2 is a transverse sectional view through the pedestal taken along the line 2—2 of FIG. 1, with the overhanging portion of the power outlet box appearing in bottom plan.

FIG. 3 is a perspective view looking down on the top of the pedestal by itself, with the hood broken away.

FIG. 4 is a top plan view of the assembly of FIG. 1 with the cover removed.

FIG. 5 shows the power outlet box and upper portion of the pedestal, partly in elevation and partly in vertical section.

FIG. 6 is a transverse vertical section perpendicular to FIG. 5.

The generally rectangular, upstanding housing or power outlet box B is formed of sheet metal bent to provide a vertically disposed, flat back surface 10 with forward extending, parallel sides 11, 12. Spaced forward from the inner face of the rear wall 10 is a vertical panel 13 having its upper margin configured as a rear-opening cross channel 14 and its lower margin angularly outset at 15 to form a footing strip 16 which is anchored by screws 17 to an insulating slab 18 which internally overlies a transverse bottom wall 19 of the box. The bottom 19 is spaced upward from the lower edges of the upright walls 10, 11, 12 and formed with upturned margin strips 20. Along its longitudinal edges, the panel 13 is secured to the respective side walls 11, 12 by screws 23 inserted through a right angle positioning strip 21, 22, the latter being spot welded to the respective side walls.

An upright pair of laterally separated, bus bars 25, 26 are spaced between the panel 13 and the rear wall 10, each being anchored to the latter by a pair of insulating posts 28, 29. The lower end of each bus bar is crocked at 30, from which it extends vertically downward as a terminal prong or bayonet contact insert 32, 33 which traverse an insulation slab 18 and project downward through an opening 24 of the bottom wall 19. The pair of bus bars extend substantially the height of the housing and at its upper end, each bus bar 25, 26 is bolted to a U-shaped conductor 35, 36, which in turn are bolted to a pair of spring jaw holders 37, 38. Four spring jaw terminals 39, 40, 41, 42 are mounted on an insulation block 43 which is secured to the cross channel portion 14 of the panel 13 by screws or fasteners 44, 45. The four spring jaws are located to receive the corresponding insertion prong terminals 46 (FIGS. 4 & 6) of a meter M which may be mounted adjacent the front face of the box after the assembly has been connected to the supply and service lines. A centrally apertured front wall 48 overlies the upper portion of the box, with its annular groove 49 surrounding the opening 50 intended to be outwardly embraced by a sealing band 51 after insertion of the meter. A flat-top cover 52 serves to close the top of the housing, secured by screws.

Spaced downward from the meter mount (43) along the front of the panel 13 is a mounting plate 54 secured to the panel by screws 55 and supporting a main circuit breaker 56 and such sub circuit breakers 57, 58, 59 as may be required. The circuit breaker 56 is connected to attachment lugs 60, 61 by conduits 62, 63, thus being coupled to the respective bus bars 25, 26 upon installation of the meter M. Beneath the circuit breaker units is a forward-projecting bridge-type bracket 65 secured to the panel 13 by screws 66 and carrying plug receptacles 67, 68, 69 which are conduit-connected to the respective sub circuit breakers. A guard plate 72 is formed with cut-out openings 73 located respectively to overlie the descending row of switch levers starting from the main circuit control lever 64, plus the cross row of plug receptacles positioned by the bracket 65, the guard plate being secured to four right-angle support tabs 74, 75, 76, 77 by screws. Along the lower margin of the guard panel is mounted an outward and downwardly slanted apron 78 fastened to the tabs 76, 77 and to an upturned edge of the bottom wall 19 by screws 79, 80.

Along the upper margin of the guard panel 72, is an outward projecting shelf 82 having a vertical edge-strip 83 received beneath the terminal lip 47 of the front wall 48, and with turned-down, lateral attachment strips 84, 85 which outwardly overlie the respective side walls 11, 12. A front closure panel 86 has its longitudinal edge strips 87, 88 held between the attachment strips and the side housing walls 11, 12, by means of a pair of bolts 89, 90 (FIGS. 1 & 6) received through elongated slots 91 (FIG. 6) so as to serve as hinge pins for the panel which is slidable along the length of the slots. The closure 86 can thus be lifted up by pivoting it on the axis of the pair of pins and then slid inward the length of the slots 91 so that its top edge 92 will abut the underface of the shelf 82 and transiently hold the panel outslanted as may be required to inspect or work on the installations within the box. Adjacent the bottom of the panel is a vertical slot in position to be traversed by an apertured tongue or lock bar 93 projecting outward from the inner face of housing side wall 11 and thus adapted to receive a padlock or the like for the purpose of holding the panel closed. The portion of the bottom wall 19 which remains exposed to the exterior when the outlet box B is mounted on the pedestal P, is formed with a pair of aperture means 70, 71 (FIG. 2) consisting of concentric, annular lines of weakness by which circles of selected diameter can be punched out of the wall upon installation so as to carry outlet lines therethrough from the plug receptacles 67, 68, 69.

Intermediate the two, main current-carrying bus bars 25, 26 is a shorter, vertical bus bar 27, spaced from the rear face of the panel 13 by an insulation spacer 31, with a forward projecting arm 95 traversing the panel and terminally secured to a block 96 of ground-connection lugs to which the plug receptacles 67, 68, 69 are grounded and to which block the ground contact 97 of the box itself is joined. At its opposite or lowermost end, this "ground" bus bar 27 is formed with a bayonet contact 34, in transverse alignment with the two other "live" bayonet contacts 32, 33.

The pedestal P is essentially an elongated rectangular housing formed of sheet metal sides 98, 99 and rear wall 100, with two front, removable and sealable, closure panels 101, 102, the upper one formed with ventilation louvers 103 a little above the ground level, and the lower panel having its bottom edge 105 disposed somewhat higher than the bottom of the rest of the housing so as to enable underground conduits to be brought into the bottom of the tubular housing and carried above the level of the ground (which ground may be replaced in the bottom portion of the housing to the height of that outside) for connection to attachment lugs (118, 120) in the upper portion of the pedestal. After such permanent connection of the underground lines, a transverse vapor barrier, formed by a solid plate 104, is installed embracing the cables so as to seal off the upper interior of the housing. At about the same level, a bridge-shaped bracket 106 is secured to the outer face of each side wall for holding external television and/or telephone cables.

An elongated, inverted-U-shaped channel member 108 of insulating material, such as phenolic resin, is mounted flush with the top edges of the housing by attachment to end brackets 109, 110, secured to the inner faces of the respective side walls, the side arms of the U-channel being spaced inward from the housing walls 100, 101, and the top-facing, cross arm of the U-channel being formed with three guide slots 111, 112, 113 alignable with the three bayonet prongs 32, 34, 33 projecting from the power outlet box. A cross bar 114 of insulating material (FIGS. 2 & 6) is secured to the rear wall 100 and carries on its forward face three spring jaws 115, 116, 117 (FIG. 5) aligned with the respective slots 111, 112, 113; disposed dependent from the respective spring jaws, are three corresponding twin terminal lugs 118, 119, 120.

A top hood 122 is provided for attachment by screws to the end wall sockets 123, 124 of the pedestal, and removal prior to the power outlet box being placed thereon. After the latter is positioned by thrust insertion of the bayonet contacts 32, 34, 33 in the spring jaws 115, 116, 117, the three outer overlying walls 10, 11, 12 of the box are fastened to the corresponding pedestal walls 100, 98, 99 by screws inserted through the openings 125, 126 (FIG. 1) and into the underlying sockets 123, 124 (FIG. 3). By this simple manipulation, the outlet box B is in effect "permanently" coupled to the pedestal P, and the interconnection of the two units may take place in such manner at any time subsequent to the ground installation and power line connection of the pedestal. At the same time, the two units can be quickly uncoupled should the need for such arise; and any such outlet box can be thrust-mounted on any pedestal as long as the pattern of bayonet contacts 32, 34, 33 corresponds to that of the guide slots 111, 112, 113 and aligned spring jaws 115, 116, 117. While these three elements are transversely aligned in the present embodiment, it will be apparent that they can be arranged in other patterns as long as the same pattern is used for the box and the pedestal. However the effectiveness of the bus bars 25, 26 as structural supports for the overhanging box B may be seen from the fact that the three bayonet inserts need not be horizontally staggered in order to obtain stability of the assembly.

In some instances, the present construction of upstanding earth-mounted pedestal and thrust-connected, overhanging power outlet box may be furnished without meter attachment means (i.e., lacking the spring jaw terminals 39, 40, 41, 42 and front opening 50). Such assemblies find use in parks or staging areas for recreational vehicles and the like, where vehicles are usually connected to such an outlet for a short period of time and the electric current for the whole plot comes through the main meter and is not measured at each unit outlet. It will be apparent also that the term "aperture means" as hereafter used in the claims includes potential "punch-out" areas such as 70, 71 even before actual openings have been made through the wall at the time or place of installation.

I claim:

1. An upstanding pedestal unit for mounting an electric power outlet box comprising an elongated, hollow housing of rectangular cross-section having upper and lower portions; said lower portion being adapted to be buried in the ground and having an opening therein to receive underground electric power lines for internal installation within said housing; said upper portion having a horizontally disposed top surface to support said outlet box in a non-conductive relationship with said housing when said box is mounted on the top surface of said unit; attachment means insulatingly positioned interiorly in said upper portion to receive said power lines conductively; a plurality of vertically extending spring jaws conductively secured to the attachment means to receive said power outlet box vertically in conductive relationship when said box is mounted on said unit, said jaws being positioned below and adjacent said surface.

2. A pedestal mount according to claim 1 which has a removable hood to protectively overlie said support surface and spring jaws in the absence of a power outlet box mounted thereupon.

3. A pedestal unit according to claim 1 wherein said support surface comprises a flat-top insulating member formed with generally vertical guide slots disposed in line with said spring jaws.

4. The combination of a pedestal mount according to claim 1 and an electric power outlet box functionally mounted thereon and characterized by a housing having a pair of longitudinally upstanding, laterally separated bus bars, each projecting generally vertically downward as a bayonet contact beneath a bottom surface of the housing in position of retention in the corresponding spring jaws of the pedestal, with the bottom surface of the housing being frictionally located upon the top support surface of the pedestal, said bus bars being connected within said housing to attachment means for outlet conduits.

5. The combination of claim 4 wherein said pair of longitudinal bus bars upstanding within the housing are insulatingly joined to at least three upstanding side walls so as to constitute structural supports for said housing, and said bottom surface extends beneath a laterally overhanging portion of the housing and is formed with aperture means laterally displaced from said projecting bayonet contacts so as to permit emergence of electric service conduits therefrom without interference with said pedestal.

6. An electric power outlet box characterized by a housing having a a pair of longitudinally upstanding, laterally separated bus bars connected within said housing to attachment means for outlet conduits, each bus bar projecting generally vertically downward as a bayonet contact beneath a transverse bottom surface of the housing in position for vertical insertion into corresponding spring jaw means of a pedestal mount, whereby said bottom surface of the housing may be detachably frictionally located upon a top support surface of a pedestal mount having a top, transverse support surface with dependent spring jaw means disposed for vertical reception of said bayonet contacts, said spring jaw means being conductingly connected within said pedestal mount to attachment means adapted to be connected to underground power lines, said bus bars serving as structural supports for said housing to which they are insulatingly attached.

7. An electric power outlet box according to claim 6 wherein said bus bars are connected within said housing to meter attachment means and circuit breaker means in addition to said attachment means for outlet conduits.

8. An electric power outlet box according to claim 4 which is characterized by a third bus bar similarly downward projecting a bayonet contact beneath the bottom surface of the housing and forming a ground connection for insertion in spring jaw means of a pedestal mount.

9. An electric power outlet box according to claim 6 wherein said pair of longitudinal bus bars are upstanding substantially the height of the housing and are insulatingly joined to at least three upstanding side walls of the housing so as to constitute the principal structural supports for said housing.

10. An electric power outlet box according to claim 6 wherein said bottom surface extends beneath a laterally overhanging portion of the housing and is formed with aperture means laterally displaced from said projecting bayonet contacts so as to permit emergence of electric service conduits therefrom without interference with a pedestal upon which the outlet box may be mounted.

* * * * *